(12) United States Patent
Remy et al.

(10) Patent No.: US 12,729,647 B1
(45) Date of Patent: Sep. 8, 2026

(54) IMPELLER BACK-FACE COOLING MANIFOLD

(71) Applicant: Pratt & Whitney Canada Corp., Longueuil (CA)

(72) Inventors: Patrice Remy, St-Hubert (CA); Ian Macfarlane, St-Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/247,532

(22) Filed: Jun. 24, 2025

(51) Int. Cl.

| | |
|---|---|
| ***F01D 5/04*** | (2006.01) |
| ***F01D 25/12*** | (2006.01) |
| ***F02C 3/00*** | (2006.01) |
| ***F02C 7/12*** | (2006.01) |

(52) U.S. Cl.
CPC ................ *F02C 7/12* (2013.01); *F01D 5/046* (2013.01); *F01D 25/12* (2013.01); *F02C 3/00* (2013.01); *F05D 2260/213* (2013.01)

(58) Field of Classification Search
CPC .... F02C 7/12; F02C 3/00; F01D 5/046; F01D 25/12; F05D 2260/213; F04D 29/58
See application file for complete search history.

(56) References Cited

U.S. PATENT DOCUMENTS 2,384,251 A * 9/1945 Hill ....................... F04D 29/584 165/104.31
2,998,958 A * 9/1961 Joseph .................... F01D 5/082 165/51
3,635,586 A * 1/1972 Kent ....................... F01D 5/081 415/115
4,923,370 A 5/1990 Larson et al.
6,190,123 B1 * 2/2001 Wunderwald ......... F04D 29/584 415/168.1
6,257,834 B1 * 7/2001 Bremer ................. F04D 29/584 417/406
6,276,896 B1 8/2001 Burge et al.
8,137,075 B2 * 3/2012 Howe ................. F04D 27/0246 416/185
8,226,353 B2 * 7/2012 Argaud ................. F04D 29/284 415/176
9,291,089 B2 * 3/2016 Powers ................... F02B 29/04
12,276,224 B2 * 4/2025 Kuno ...................... F02C 3/062
(Continued)

FOREIGN PATENT DOCUMENTS

JP 58214697 A * 12/1983

*Primary Examiner* — Nathaniel E Wiehe
*Assistant Examiner* — Wayne A Lambert
(74) *Attorney, Agent, or Firm* — CANTOR COLBURN LLP

(57) ABSTRACT

A cooling manifold of a diffuser baffle of a compressor section of a gas turbine engine of an aircraft is provided. The cooling manifold includes an interior body and an exterior body. The interior body includes an interior body surface and an elongate, solid body extending from the interior body surface and defining one or more through-vias. The exterior body is configured to surround the interior body to form a cavity, which is fluidly communicative with the one or more through-vias, between the exterior body and the interior body. The exterior body defines one or more apertures by which the cavity is receptive of coolant such that the coolant is distributed throughout the cavity and exhausted tangentially through each of the one or more through-vias.

18 Claims, 4 Drawing Sheets

(56) References Cited

U.S. PATENT DOCUMENTS

| | | | | |
|---|---|---|---|---|
| 2002/0141882 | A1* | 10/2002 | Ingistov | F04D 29/5846 417/244 |
| 2010/0260598 | A1* | 10/2010 | Kirby | F01D 11/24 415/177 |
| 2012/0003081 | A1* | 1/2012 | Woollenweber | F01D 5/082 415/180 |
| 2015/0052897 | A1* | 2/2015 | Intile | F02C 7/12 60/726 |

* cited by examiner

IMPELLER BACK-FACE COOLING MANIFOLD

BACKGROUND

The present disclosure relates to gas turbine engines and, in particular, to an impeller back-face cooling manifold of a gas turbine engine, such as a gas turbine engine of an aircraft.

In a gas turbine engine, fuel and compressed air are combusted in a combustor to produce a high-temperature and high-pressure fluid. This fluid enters a turbine and interacts with rows or stages of turbine blades and vanes. The interaction between the high-temperature and high-pressure fluid with the turbine blades and vanes causes the stages of turbine blades to rotate a shaft. The shaft rotation drives a compressor to compress the air for the combustor and, as noted above, can be used to drive operations of a generator to produce electricity and/or for propulsion.

SUMMARY

According to an aspect of the disclosure, a cooling manifold of a diffuser baffle of a compressor section of a gas turbine engine of an aircraft is provided. The cooling manifold includes an interior body and an exterior body. The interior body includes an interior body surface and an elongate, solid body extending from the interior body surface and defining one or more through-vias. The exterior body is configured to surround the interior body to form a cavity, which is fluidly communicative with the one or more through-vias, between the exterior body and the interior body. The exterior body defines one or more apertures by which the cavity is receptive of coolant such that the coolant is distributed throughout the cavity and exhausted tangentially through each of the one or more through-vias.

In accordance with at least one or more additional and/or alternative embodiments, at least one of the interior body surface and the exterior body is attachable to a diffuser baffle surface of the diffuser baffle.

In accordance with at least one or more additional and/or alternative embodiments, each of the one or more through-vias is oriented transversely relative to a plane of the interior body surface.

In accordance with at least one or more additional and/or alternative embodiments, one or more apertures are connectable with coolant delivering piping.

In accordance with at least one or more additional and/or alternative embodiments, each of the one or more apertures corresponds to multiple ones of the one or more through-vias.

In accordance with at least one or more additional and/or alternative embodiments, the interior body and the exterior body are annular about an engine centerline, the one or more apertures are provided as multiple apertures arranged about the engine centerline and each of the one or more through-vias is circumferentially angled.

According to an aspect of the disclosure, a compressor section of a gas turbine engine of an aircraft is provided. The compressor section includes an impeller, a diffuser baffle defining holes arranged about an engine centerline, the diffuser baffle being disposed proximate to the impeller whereby the impeller and the diffuser baffle define an intervening cavity therebetween, a cooling manifold attached to the diffuser baffle and configured to distribute coolant along a plane of the diffuser baffle such that the coolant is directed through each of the holes and tangentially toward the impeller and piping extending through the diffuser baffle and terminating at the cooling manifold to deliver the coolant to the cooling manifold.

In accordance with at least one or more additional and/or alternative embodiments, the compressor section further includes a compressor and a heat exchanger, wherein the coolant includes compressed air which is bled from the compressor and passed through the heat exchanger.

In accordance with at least one or more additional and/or alternative embodiments, the compressed air is compressed to a highest degree by the compressor.

In accordance with at least one or more additional and/or alternative embodiments, the piping extends from the heat exchanger and to and through the diffuser baffle.

In accordance with at least one or more additional and/or alternative embodiments, the cooling manifold is attachable to the diffuser baffle and includes an interior body and an exterior body, the interior body including an interior body surface and an elongate, solid body extending from the interior body surface and defining through-vias, each through-via being aligned with a corresponding one of the holes, the exterior body being configured to surround the interior body to form a cavity, which is fluidly communicative with the through-vias, between the exterior body and the interior body, and the exterior body defining apertures for connections with the piping and by which the cavity is receptive of the coolant from the piping such that the coolant is distributed throughout the cavity and exhausted tangentially toward each of the holes through each of the through-vias.

In accordance with at least one or more additional and/or alternative embodiments, each of the apertures corresponds to multiple ones of the through-vias.

In accordance with at least one or more additional and/or alternative embodiments, the interior body and the exterior body are annular about the engine centerline, the apertures are arranged about the engine centerline and each of the through-vias is circumferentially angled.

According to an aspect of the disclosure, a compressor section of a gas turbine engine of an aircraft is provided. The compressor section includes an impeller including an impeller front-face along which high-temperature air flows and an impeller back-face opposite the impeller front-face, a diffuser baffle, a cooling manifold and piping. The diffuser baffle includes a sheet element defining holes arranged about an engine centerline. The diffuser baffle is disposed proximate to the impeller whereby the impeller and the sheet element define an intervening cavity therebetween. The cooling manifold is attached to the sheet element and is configured to distribute coolant along a plane of the diffuser baffle such that the coolant is directed through each of the holes and tangentially toward the impeller. The piping extends through the diffuser baffle and terminates at the cooling manifold to deliver the coolant to the cooling manifold.

In accordance with at least one or more additional and/or alternative embodiments, the compressor section further includes a compressor and a heat exchanger, wherein the coolant includes compressed air which is bled from the compressor and passed through the heat exchanger.

In accordance with at least one or more additional and/or alternative embodiments, the compressed air is compressed to a highest degree by the compressor.

In accordance with at least one or more additional and/or alternative embodiments, the piping extends from the heat exchanger and to and through the diffuser baffle.

In accordance with at least one or more additional and/or alternative embodiments, the cooling manifold is attachable to the sheet element and includes an interior body and an exterior body, the interior body including an interior body surface and an elongate, solid body extending from the interior body surface and defining through-vias, each through-via being aligned with a corresponding one of the holes, the exterior body being configured to surround the interior body to form a cavity, which is fluidly communicative with the through-vias, between the exterior body and the interior body, and the exterior body defining apertures for connections with the piping and by which the cavity is receptive of the coolant from the piping such that the coolant is distributed throughout the cavity and exhausted toward each of the holes through each of the through-vias.

In accordance with at least one or more additional and/or alternative embodiments, each of the apertures corresponds to multiple ones of the through-vias.

In accordance with at least one or more additional and/or alternative embodiments, the interior body and the exterior body are annular about the engine centerline, the apertures are arranged about the engine centerline and each of the through-vias is circumferentially angled.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The following disclosure is applicable to any type of gas turbine engine, including, but not limited to, turbofans, turboshafts, turboprops, turbojets, electrical drives, hybrid drives, etc. The gas turbine engine described below is provided by way of example, and should not be interpreted as limiting the scope of the application or the claims in any way.

Figure 1:
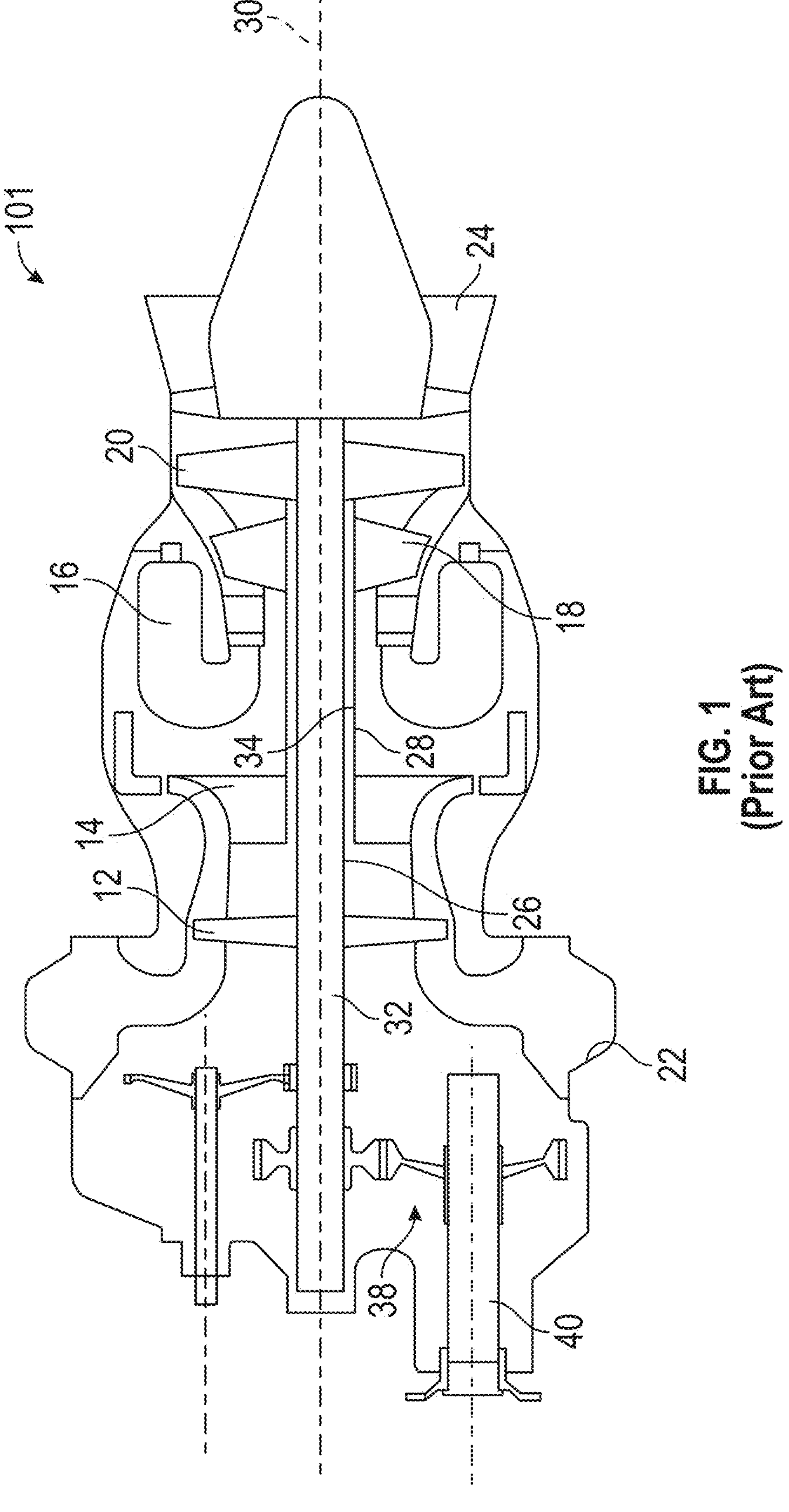
FIG. 1 is a cross-sectional view of a prior art turboshaft engine.

With reference to FIG. 1, a turboshaft engine 101 is provided and configured as a gas turbine engine. In particular, the turboshaft engine 101 is a generally conventional turboshaft engine generally including, in serial flow communication, a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14 and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The turboshaft engine 101 has multiple, i.e. two or more, spools which may perform the compression to pressurize the air received through an air inlet 22, and which extract energy from the combustion gases before they exit via an exhaust outlet 24. For example, the turboshaft engine 101 can include a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The turboshaft engine 101 may further include a transmission 38 driven by the low pressure shaft 32 and driving a rotatable output shaft 40. The transmission 38 may vary a ratio between rotational speeds of the low pressure shaft 32 and the output shaft 40.

Within the high-pressure compressor section 14, high-temperature and high-pressure air flows along a gap formed between an impeller and an impeller shroud and between the impeller and a back-face baffle (can be called either a back-face baffle or a diffuser baffle, since it is normally attached to the diffuser, but functionally it is an impeller back-face baffle) and is used to provide pressurized air to an engine secondary air system (SAS). This high-temperature and high-pressure air tends to heat the impeller as if flows past the impeller back-face, which can reduce material capabilities, thus necessitating an introduction of cooling air flow to help reduce impeller metal temperatures.

While various schemes have been proposed to provide for and increase impeller cooling, these schemes tend to be ineffective or tend to create additional problems. For example, injecting cooling flows perpendicularly toward the impeller can increase friction or swirl that reduces the cooling effect. As another example, reducing the gap between the impeller and the baffle can increase friction and lead to increased temperatures.

A need therefore exists for a gas turbine engine, such as a gas turbine engine of an aircraft, in which cooling air flows are directed tangentially toward the back-face of the impeller.

Thus, as will be described below, a system is provided to cool the back-face of the impeller using cooled bleed air that is tapped from a high-pressure location, such as compressed air that is bled from the highest stage of a compressor section (i.e., P3 air) and subsequently passed through a heat exchanger and re-injected tangentially toward the back-face of the impeller.

Figure 2:
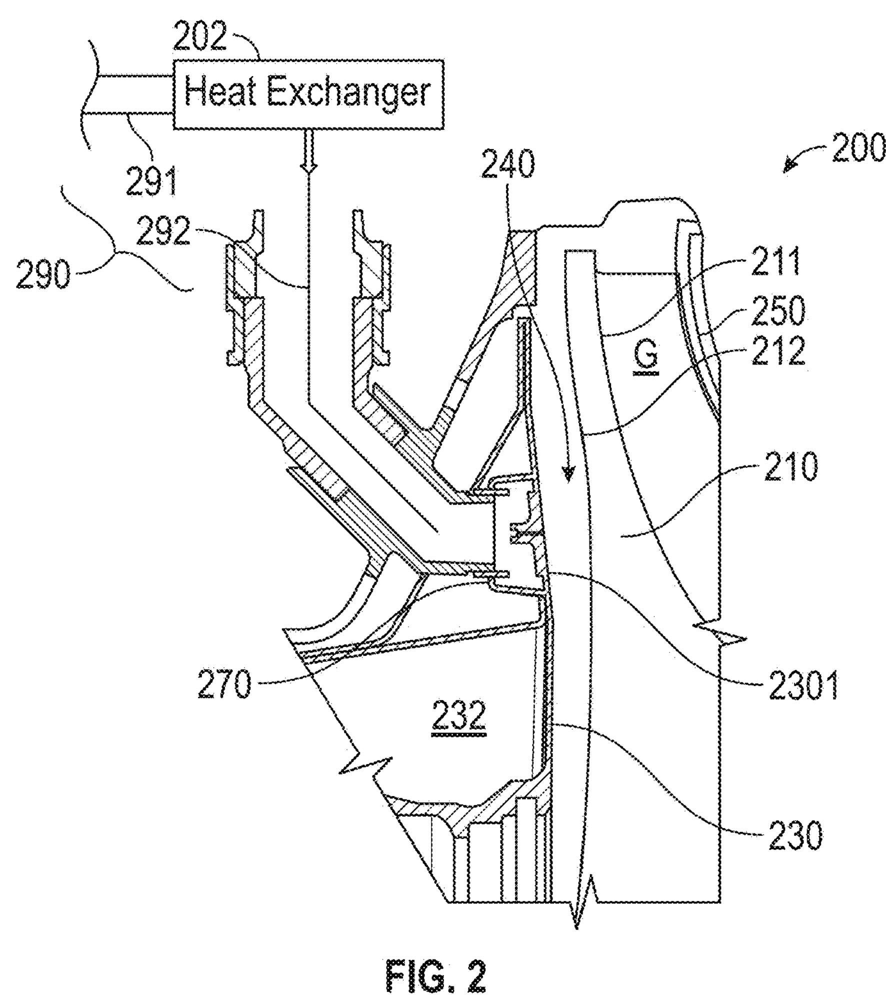
FIG. 2 is a side view of a compressor section of a gas turbine engine of an aircraft with a cooling manifold in accordance with embodiments.
Figure 3:
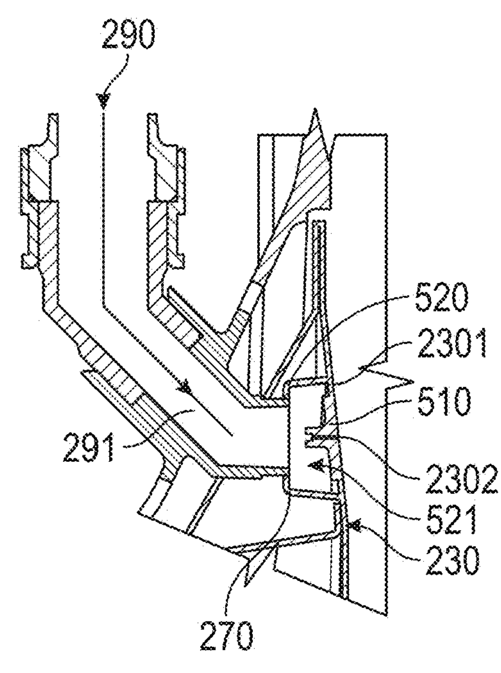
FIG. 3 is an enlarged side view of a compressor section of a gas turbine engine of an aircraft with a cooling manifold in accordance with embodiments.
Figure 4:
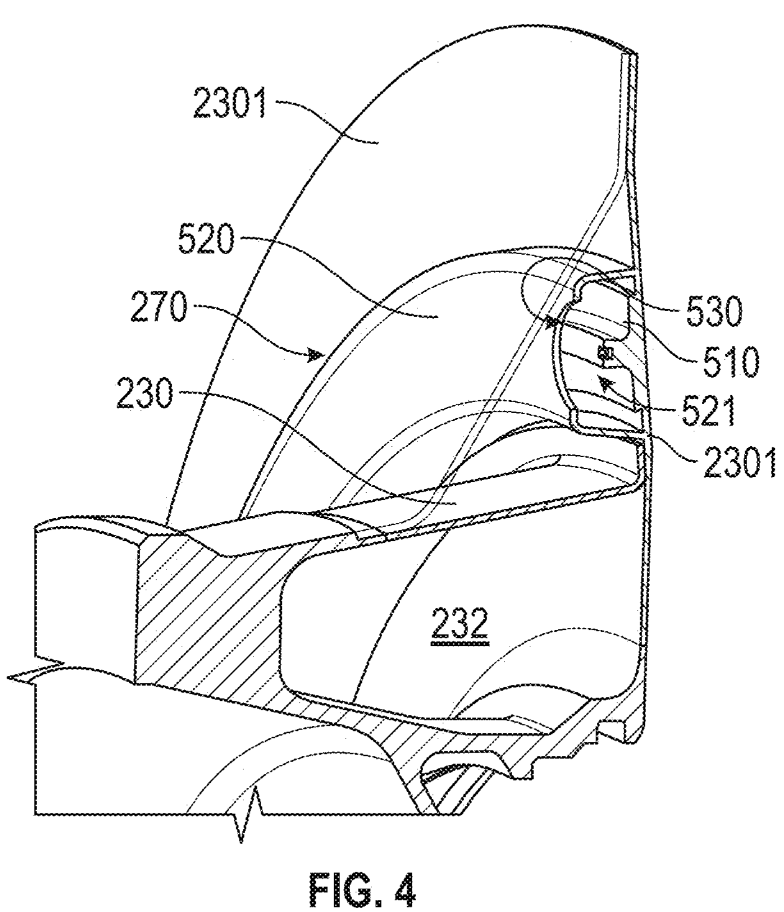
FIG. 4 is a perspective view of a compressor section of a gas turbine engine of an aircraft with a cooling manifold in accordance with embodiments.

With reference to FIGS. 2-4, a compressor section 200 of a gas turbine engine of an aircraft, such as the high-pressure compressor section 14 of FIG. 1, is provided. The compressor section 200 includes an impeller 210, a diffuser baffle 230, an impeller shroud 250, a cooling manifold 270 and piping 290. The impeller 210 includes an impeller front-face 211 and an impeller back-face 212. The impeller shroud 250 faces the impeller front-face 211 at a distance to define a gap G. High-temperature air flows can be directed to flow through the gap G and along the impeller front-face 211. The impeller back-face 212 is disposed opposite the impeller front-face 211. The diffuser baffle 230 can be formed to define an internal cavity 232 and includes a sheet element 2301. The sheet element 2301 is formed to define holes 2302 (see FIG. 5A and FIG. 6). The holes 2302 are arranged about an engine centerline (see, e.g., the engine axis 30 of FIG. 1). The diffuser baffle 230 and the sheet element 2301 are disposed proximate to the impeller back-face 211 and the impeller 210, whereby the impeller back-face 211 and the sheet element 2301 define an intervening cavity 240 therebetween. The sheet element 2301 faces the impeller back-face 212 across the intervening cavity 240. The cooling manifold 270 can be installed in or at the sheet element 2301 of the diffuser baffle 230 and is configured to distribute coolant along a plane P (see FIG. 5A) of the sheet element 2301 such that the coolant is directed through each of the holes 2302 and tangentially toward the impeller back-face 211 of the impeller 210 in a direction that includes at least a circumferential directional component CDC (see FIG. 5B) and an axial directional component ADC (see FIG. 5B). The piping 290 extends through the diffuser baffle 230 and terminates in or at the cooling manifold 270 to deliver the coolant to the cooling manifold 270.

The compressor section 200 can further include a compressor as shown in FIG. 1 and a heat exchanger 202 and the coolant can include or be provided as compressed air that is bled from the compressor and passed through the heat exchanger 202. In accordance with embodiments, the compressed air can be air that is compressed to a highest degree by the compressor (i.e., P3 air). This highly compressed air can be bled from the compressor and passed through the heat exchanger 202 and still have sufficient pressure to serve as coolant for the impeller 210. Where the compressor section 200 includes the compressor and the heat exchanger 202, the piping 290 can include first piping 291 and second piping 292. The first piping 291 extends from a cavity fluidly communicative with a highest stage of the compressor, through a gas turbine engine casing and to the heat exchanger 202. The second piping 292 extends from the heat exchanger 202 into and through the gas turbine engine casing and to and through the diffuser baffle 230 to the cooling manifold 270.

Figure 5A:
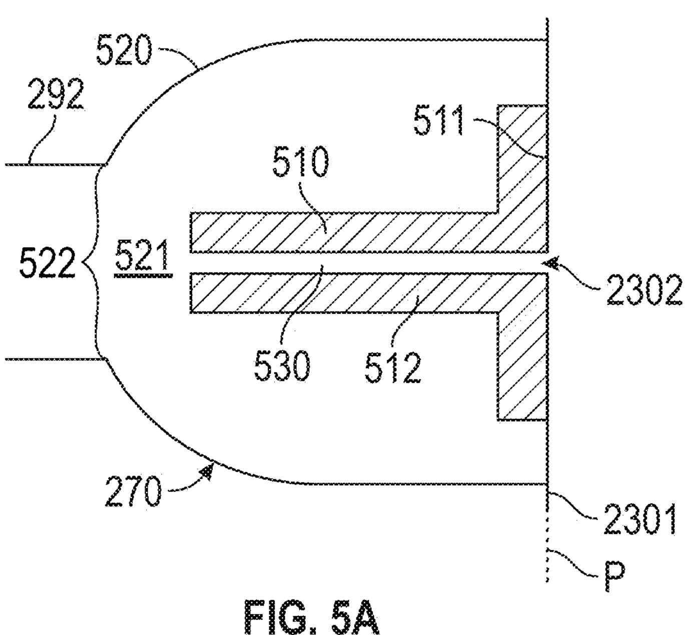
FIG. 5A is a schematic cross-sectional illustration of the cooling manifold of FIGS. 2-4 from a circumferential point of view in accordance with embodiments.
Figure 5B:
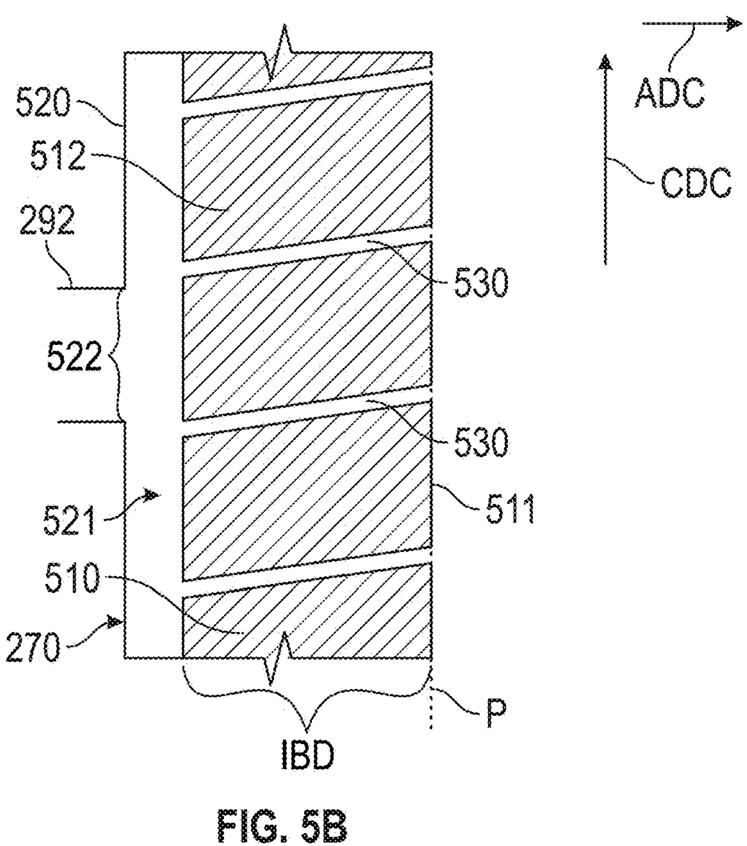
FIG. 5B is a schematic cross-sectional illustration of the cooling manifold of FIGS. 2-4 from a radial point of view in accordance with embodiments.
Figure 6:
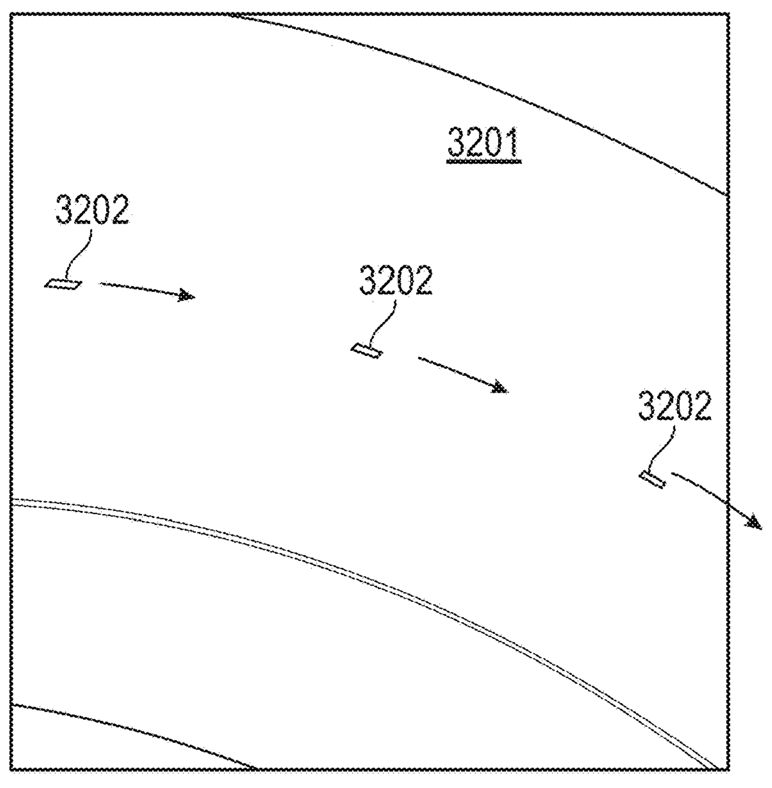
FIG. 6 is an axial view of a sheet element defining holes arranged about an engine centerline of a diffuser baffle in accordance with embodiments.

With continued reference to FIGS. 2-4 and with additional reference to FIGS. 5A and 5B and FIG. 6, the cooling manifold 270 is attachable to the sheet element 2301 and includes an interior body 510 and an exterior body 520. The interior body 510 includes an interior body surface 511 and an elongate, solid body 512 that extends from the interior body surface 511. The elongate, solid body 512 is formed to define one or more through-vias 530. The exterior body 520 is configured to surround the interior body 510 to form a cavity 521 between the exterior body 510 and the interior body 510. The cavity 521 is fluidly communicative with each of the one or more through-vias 530. The exterior body 520 is formed to define one or more apertures 522. Each of the one or more apertures 522 is connectable with the second piping 292. The cavity 521 is thus receptive of the coolant delivered by the piping 290 via each of the one or more apertures 522. Once the coolant is received in the cavity 521, the coolant is distributed throughout the cavity 521 and is exhausted through each of the one or more through-vias 530 toward and through each of the holes 2302. Each of the one or more apertures 522 can correspond to multiple ones of the one or more through-vias 530 as shown in FIG. 4B.

As shown in FIG. 4 and in FIG. 6, the interior body 510 and the exterior body 530 can be annular about the engine centerline (see, e.g., the engine axis 30 of FIG. 1). The one or more apertures 522 can be provided as multiple apertures 522 that are arranged about the engine centerline. As shown in FIGS. 5A and 5B, each of the one or more through-vias 530 can be transversely oriented relative to the plane P of the sheet element 2301 and circumferentially angled. The circumferential angling of each of the one or more through-vias 530 allows the coolant to flow through each of the holes 2302 and tangentially toward the impeller back-face 212 with an axial directional component and with a circumferential directional component. The circumferential directionality of the flow of the coolant allows for swirl effects and mixing within the intervening cavity 240. A magnitude of the angling of each of the one or more through-vias 530 can be relatively large such each of the one or more through-vias 530 is shallow relative to the plane P.

The sheet element 2301 is relatively thin and can be formed from sheet metal, for example. By contrast, as shown in FIG. 5B, the interior body 520 has a relatively substantial depth IBD from the plane P. The solidity of the elongate, solid body 512 and the relatively substantial depth IBD allows for the angling of each of the one or more through-vias 530.

Technical effects and benefits of the present disclosure are the provision of a system for cooling the back-face of an impeller using cooled bleed air that is tapped from a high-pressure location, such as compressed air that is bled from the highest stage of a compressor section (i.e., P3 air) and subsequently passed through a heat exchanger, distributed throughout a cooling manifold and re-injected from the cooling manifold and toward the back-face of the impeller.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A cooling manifold of a diffuser baffle of a compressor section of a gas turbine engine of an aircraft, the cooling manifold comprising:

an interior body comprising:

an interior body surface; and an elongate, solid body extending from the interior body surface and defining one or more through-vias; and an exterior body configured to surround the interior body to form a cavity, which is fluidly communicative with the one or more through-vias, between the exterior body and the interior body, the interior body and the exterior body being annular about an engine centerline, and the exterior body comprising an annular outboard portion with a radially inwardly curving distal end outboard of the interior body, an annular inboard portion with a radially outwardly curving distal end inboard of the interior body and an annular connecting portion extending between the respective distal ends of the annular outboard and inboard portions and defining one or more apertures as multiple apertures arranged about the engine centerline by which the cavity is receptive of coolant such that the coolant is distributed throughout the cavity and exhausted tangentially through each of the one or more through-vias.

2. The cooling manifold according to claim 1, wherein at least one of the interior body surface and the exterior body is attachable to a diffuser baffle surface of the diffuser baffle.

3. The cooling manifold according to claim 1, wherein each of the one or more through-vias is oriented transversely relative to a plane of the interior body surface.

4. The cooling manifold according to claim 1, wherein each of the one or more apertures are connectable with coolant delivering piping.

5. The cooling manifold according to claim 1, wherein each of the one or more apertures corresponds to multiple ones of the one or more through-vias.

6. The cooling manifold according to claim 1, wherein each of the one or more through-vias is circumferentially angled.

7. A compressor section of a gas turbine engine of an aircraft, the compressor section comprising:

an impeller;

a diffuser baffle defining holes arranged about an engine centerline, the diffuser baffle being disposed proximate to the impeller whereby the impeller and the diffuser baffle define an intervening cavity therebetween;

a cooling manifold attached to the diffuser baffle and configured to distribute coolant along a plane of the diffuser baffle such that the coolant is directed through each of the holes and tangentially toward the impeller; and piping extending through the diffuser baffle and terminating at the cooling manifold to deliver the coolant to the cooling manifold, wherein the cooling manifold comprises:

an interior body comprising an interior body surface and an elongate, solid body extending from the interior body surface and defining through-vias, each through-via being aligned with a corresponding one of the holes; and an exterior body configured to surround the interior body to form a cavity, which is fluidly communicative with the through-vias, between the exterior body and the interior body, and the interior body and the exterior body being annular about an engine centerline and the exterior body comprising an annular outboard portion with a radially inwardly curving distal end outboard of the interior body, an annular inboard portion with a radially outwardly curving distal end inboard of the interior body and an annular connecting portion extending between the respective distal ends of the annular outboard and inboard portions and defining one or more apertures as multiple apertures arranged about the engine centerline by which the cavity is receptive of the coolant such that the coolant is distributed throughout the cavity and exhausted tangentially through each of the one or more through-vias.

8. The compressor section according to claim 7, further comprising:

a compressor; and a heat exchanger, wherein the coolant comprises compressed air which is bled from the compressor and passed through the heat exchanger.

9. The compressor section according to claim 8, wherein the compressed air is compressed to a highest degree by the compressor.

10. The compressor section according to claim 8, wherein the piping extends from the heat exchanger and to and through the diffuser baffle.

11. The compressor section according to claim 7, wherein each of the apertures corresponds to multiple ones of the through-vias.

12. The compressor section according to claim 7, wherein each of the through-vias is circumferentially angled.

13. A compressor section of a gas turbine engine of an aircraft, the compressor section comprising:

an impeller comprising an impeller front-face along which high-temperature air flows and an impeller back-face opposite the impeller front-face;

a diffuser baffle comprising a sheet element defining holes arranged about an engine centerline, the diffuser baffle being disposed proximate to the impeller whereby the impeller and the sheet element define an intervening cavity therebetween;

a cooling manifold attached to the sheet element and configured to distribute coolant along a plane of the diffuser baffle such that the coolant is directed through each of the holes and tangentially toward the impeller; and piping extending through the diffuser baffle and terminating at the cooling manifold to deliver the coolant to the cooling manifold, wherein the cooling manifold comprises:

an interior body comprising an interior body surface and an elongate, solid body extending from the interior body surface and defining through-vias, each through-via being aligned with a corresponding one of the holes; and an exterior body configured to surround the interior body to form a cavity, which is fluidly communicative with the through-vias, between the exterior body and the interior body, and the interior body and the exterior body being annular about an engine centerline and the exterior body comprising an annular outboard portion with a radially inwardly curving distal end outboard of the interior body, an annular inboard portion with a radially outwardly curving distal end inboard of the interior body and an annular connecting portion extending between the respective distal ends of the annular outboard and inboard portions and defining one or more apertures as multiple apertures arranged about the engine centerline by which the cavity is receptive of the coolant such that the coolant is distributed throughout the cavity and exhausted tangentially through each of the one or more through-vias.

14. The compressor section according to claim 13, further comprising:

a compressor; and a heat exchanger, wherein the coolant comprises compressed air which is bled from the compressor and passed through the heat exchanger.

15. The compressor section according to claim 14, wherein the compressed air is compressed to a highest degree by the compressor.

16. The compressor section according to claim 14, wherein the piping extends from the heat exchanger and to and through the diffuser baffle.

17. The compressor section according to claim 13, wherein each of the apertures corresponds to multiple ones of the through-vias.

18. The compressor section according to claim 13, wherein each of the through-vias is circumferentially angled.

* * * * *